United States Patent
Vasin et al.

(10) Patent No.: US 6,442,931 B1
(45) Date of Patent: *Sep. 3, 2002

(54) COMBUSTION CHAMBER CASING OF A LIQUID-FUEL ROCKET ENGINE

(75) Inventors: Alexandr Alexandrovich Vasin; Vladimir Vladamirovich Fedorov; Galina Andreevna Babaeva, all of Moscow (RU)

(73) Assignee: Otkrytoe Aktsionernoe Obschestvo (RU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/392,590

(22) Filed: Sep. 9, 1999

(30) Foreign Application Priority Data

Jan. 21, 1999 (RU) .......................................... 99100830

(51) Int. Cl.⁷ ............................................... F02K 9/00
(52) U.S. Cl. .............................. 60/257; 60/271; 60/267
(58) Field of Search .......................... 60/271, 267, 257; 239/127.1, 127.3, 165.11; 428/667

(56) References Cited

U.S. PATENT DOCUMENTS

| | | | |
|---|---|---|---|
| 3,595,025 A | * 7/1971 | Stocket et al. ................. | 60/267 |
| 3,630,449 A | * 12/1971 | Butler ...................... | 239/127.1 |
| 3,648,461 A | 3/1972 | Bailey et al. | |
| 4,164,607 A | * 8/1979 | Thiel et al. .................. | 428/621 |
| 4,287,266 A | * 9/1981 | Myles ......................... | 428/596 |
| 4,563,399 A | * 1/1986 | Wright, Jr. .................. | 428/626 |
| 4,774,148 A | * 9/1988 | Goto .......................... | 428/607 |
| 5,607,779 A | * 3/1997 | Naoi .......................... | 428/634 |
| 5,626,972 A | * 5/1997 | Moysan, III et al. ....... | 428/627 |
| 6,106,958 A | * 8/2000 | Sugg et al. .................. | 428/623 |

OTHER PUBLICATIONS

"Sovetskaya Entsiklopediya" Moscow Publishing House, 1985, "Cosmonautics".

"Aircraft Engines and Power Plants" Approved textbook by the USRR State Pulblic Eduation Committe, "Liquid–Propellant Rocket Engine Design and Engineering", G.G. Gakhun, 1989.

V.P. Glushko editor–in–chief, "Sovetskaya Entsiklopediya", 1985, pages in Encyclopedia under word COSMONAUTICS; partial English translation.

Edited by Prof. G.G.Gakhum, "Liquid–Propellant Rocket Engine Design Engineering" in textbook for the students of institutes of higher education taking a course in "Aircraft Engines and Power Plants", 1989, pp. 100–111; partial English translation.

* cited by examiner

*Primary Examiner*—Charles G. Freay
*Assistant Examiner*—William Rodriguez
(74) *Attorney, Agent, or Firm*—Banner & Witcoff, Ltd.

(57) ABSTRACT

The casing comprises a combustion chamber and a nozzle, consisting of a subsonic and a supersonic sections with an external structural envelope and a fire wall having a ribbed external surface. The regenerative cooling passage is formed between the envelope and the fire wall. The fire wall is made from copper or a copper alloy, and the external structural envelope is made from steel or a nickel alloy. The fire wall has a metal coating stratified in the region of the nozzle throat over a length of not less than 0.3 diameter of the nozzle throat in the longitudinal direction. The first layer of the coating is nickel 50 $\mu$m to 1000 $\mu$m thick, and the second layer is chromium 10 $\mu$m to 500 $\mu$m thick.

2 Claims, 3 Drawing Sheets

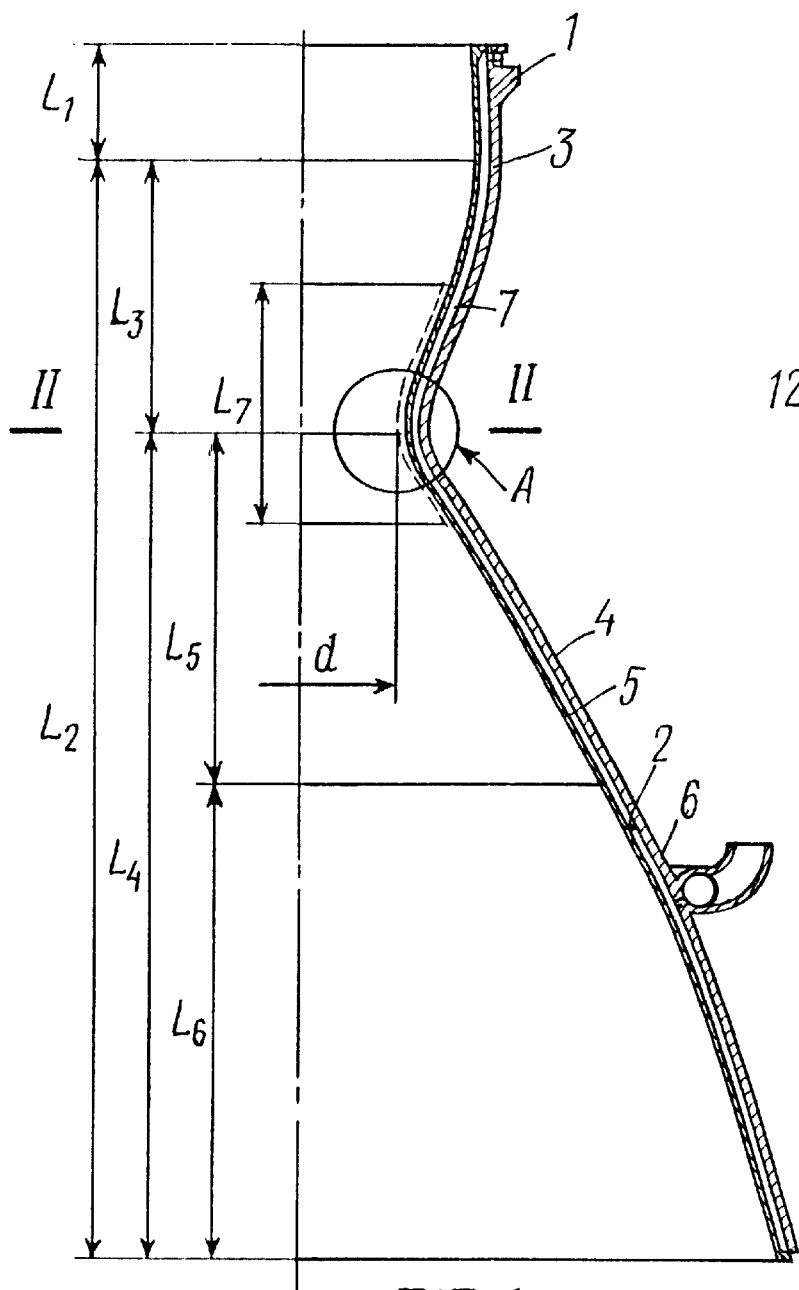
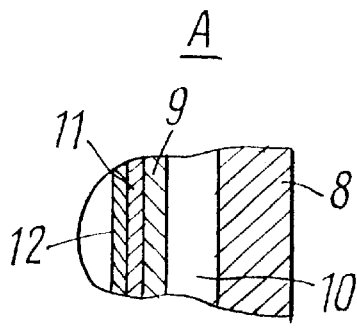
FIG. 1
FIG. 2

COMBUSTION CHAMBER CASING OF A LIQUID-FUEL ROCKET ENGINE

FIELD OF THE INVENTION

The invention relates to rocket engines and, more specifically, to the design of a combustion chamber for liquid-fuel rocket engines. The invention can be used in aircraft engine manufacturing and, to a certain extent, in heat engineering.

BACKGROUND OF THE INVENTION

Known in the art is a stratified nozzle for a solid-fuel rocket engine (U.S. Pat. No. 3648461) in which the internal insulation layer on the side of fire cavity may be ablative or non-ablative. This technical solution is deficient because of the problems associated with its effective implementation in the production of regeneratively cooled chambers of liquid-fuel rocket engines (LRE).

Prior knowledge also includes the use of coatings in LRE combustion chamber envelopes, as attested by the disclosure of LRE combustion chambers in which the effect of thermal flows is minimized by protecting their walls with ceramic heat-insulating coatings (Encyclopedia "Cosmonautics", chief ed. V. P. Glushko, M, 1985, p. 153).

The description of this design does not disclose the materials of coatings used with specific chambers, wherefore it is not clear how to achieve an appreciable extension of the service life of specific combustion chambers operating on oxygen-kerosene propellant components. Data, however, are provided on an LRE combustion chamber having a high temperature molybdenum insert with a protective zirconia coating.

The closest prior art of the present invention is a combustion chamber casing of a liquid-fuel rocket engine comprising a combustion chamber; a nozzle, consisting of a subsonic and a supersonic sections with an external structural envelope and an internal fire wall having an external ribbed surface; and a regenerative cooling passage formed between said structural envelope and said fire wall, the former being made from steel or a nickel alloy, and the latter being made from copper or a copper alloy ("Liquid-fuel Rocket Engine Design and Engineering" ed. Prof. G. G. Gakhun et al., M, 1989, pp 101–111, FIG. 6.1).

In this design the internal surface of a steel structural envelope of the combustion chamber has a protective coating and the ribs of a bronze internal shell of the chamber are electroplated.

However, the known design does not always provide the required extension of the LRE chamber service life and not infrequently calls for additional measures to improve the combustion chamber wall thermal stability.

OBJECTS OF THE INVENTION

It is an object of the present invention to eliminate the aforementioned disadvantages by providing a more durable casing of the high-thrust oxygen-kerosene LRE combustion chamber.

The technical advantage resulting from the accomplishment of this object consists in the extension of the service life of the combustion chamber casing and, consequently, the combustion chamber itself and the liquid-fuel rocket engine as a whole owing to the enhancement of the thermal stability of the internal fire wall in the LRE combustion chamber casing, particularly when operating the engine on the oxygen-kerosene bipropellant. The aforementioned coating applied in the region of the nozzle throat improves the thermal stability of the fire wall in this critical area.

SUMMARY OF THE INVENTION

In accordance with the object of the invention, the LRE combustion chamber casing which comprises a combustion chamber; a nozzle, consisting of a subsonic and a supersonic sections with an external structural envelope and an internal fire wall arranged inside said structural envelope and made from copper or a copper alloy; and a regenerative cooling passage formed between said structural envelope and said internal fire wall, is characterized in that the inner surface of said internal fire wall is provided with a metal coating consisting of two layers and arranged between the subsonic and supersonic sections of the nozzle in the region of its throat over a length of not less than 0.3 diameter of the nozzle throat in the longitudinal direction, the first layer of said coating being of nickel 50 $\mu$m to 1000 $\mu$m thick, and the second layer of said coating located on the nickel layer being of chromium 10 $\mu$m to 500 $\mu$m thick.

The combustion chamber may be provided with an internal nickel coating ranging in thickness from 50 $\mu$m to 1000 $\mu$m.

The external structural envelope may be made from steel or a nickel alloy.

The internal fire wall of the casing can also be provided with the aforementioned stratified coating over the entire length of the wall, the first layer being of nickel, and the second layer, of chrome.

The disclosed combustion chamber casing can also be used for operation on other chemically active components of rocket engine fuel, such as hydrogen, fluorine, nitric acid, asymmetric dimethylhydrazine and other products widely used in rocket engineering.

One of the embodiments of the present invention features a nickel coating 50 $\mu$m to 1000 $\mu$m thick on a part of a fire wall in the combustion chamber on the side of the fire cavity, the rest of the copper or copper alloy casing wall retaining a stratified coating at least in the region of the nozzle throat over a length of not less than 0.3 throat diameter in the longitudinal direction, the first layer of said stratified coating being nickel 50 $\mu$m to 1000 $\mu$m thick, and the second layer of said stratified coating being chrome 10 $\mu$m to 500 $\mu$m thick.

This particular embodiment of the LRE combustion chamber casing is cheaper and easier to make than the casing under consideration wherein the entire fire wall of the combustion chamber has a stratified coating consisting of a nickel and a chrome layers, as indicated above.

Another embodiment of the present invention represents a different design of the combustion chamber casing portion in the supersonic section of the nozzle on the exhaust side. Unlike the previous embodiment, which provides for a steel or nickel alloy structural envelope and a copper or copper alloy internal fire wall with a stratified metal coating and a ribbed outer surface, this embodiment features a steel or nickel alloy portion of the internal fire wall without any coating on the side of the fire cavity. The supersonic section of the combustion chamber casing nozzle on the exhaust side may also be made in the form of a heat resistant metal shell serving simultaneously as an internal fire wall. It can also be manufactured from a heat-resistant nonmetal material. In both cases there is no need to apply coatings on the exhaust portion of the supersonic nozzle on the side of the fire cavity.

Yet another advantage of the latter embodiment resides in a reduction of specific amount of metal per structure of the combustion chamber casing and, consequently, in a decrease of production costs.

A fuller understanding of the aforesaid advantages and the nature of the present invention will be obtained from the following detailed description of its preferred embodiments with reference to the accompanying drawings.

BRIEF DESCRIPTION OF THE DRAWINGS

FIG. 1 illustrates the combustion chamber casing with a stratified coating in the nozzle throat region.

FIG. 2 illustrates scaled up area A presented on a smaller scale in FIGS. 1 and 3 through 5.

DESCRIPTION OF THE PREFERRED EMBODIMENTS

Figure 3:
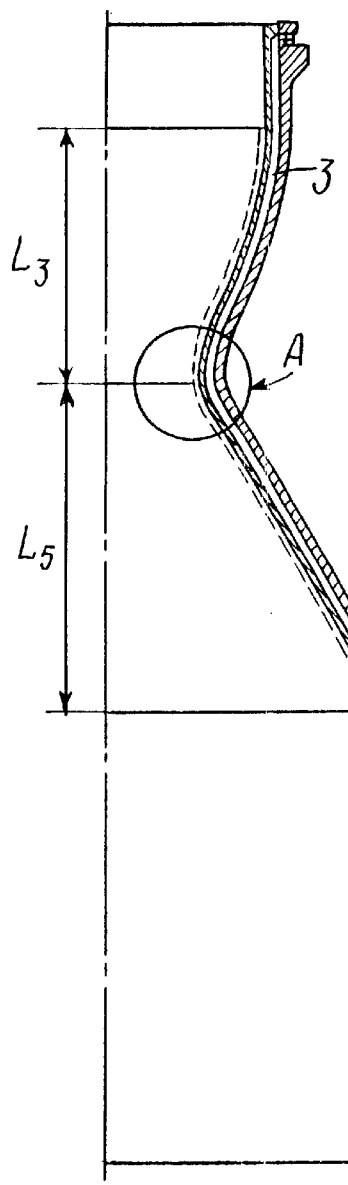
FIG. 3 illustrates the combustion chamber casing with a stratified coating on the internal fire wall of the nozzle.

FIG. 1 shows a part of combustion chamber 1 (over length $L_1$) and a part of nozzle 2 (over length $L_2$). Nozzle 2 is comprised of subsonic section 3 (shown over length $L_3$) and supersonic section 4 (shown over length $L_4$), II—II representing the nozzle throat and d representing said throat diameter. The supersonic section of nozzle 4 consists of inlet portion 5 (shown over length $L_5$) and outlet portion 6 (shown over length $L_6$).

The aforelisted components of the combustion chamber casing make the external structural envelope and the internal fire wall of the combustion chamber, said envelope and said fire wall forming a regenerative cooling passage. The external structure envelope is made from steel or a nickel alloy, and the internal fire wall is made from copper or a copper alloy.

In the area of the nozzle throat section II—II internal fire wall portion 7 on the side of the fire cavity is provided with a stratified coating described below with reference to FIG. 2. This portion extends over not less than 0.3 diameter of the nozzle section (length $L_7$). A smaller length of the coatings is prohibitive in this embodiment, as a bare fire wall in combustion chambers with extended service life is susceptible to burnouts.

In FIG. 2 which scales up area A (indicated in FIG. 1) number 8 denotes the external structural envelope, number 9, the internal fire wall, and number 10, the regenerative cooling passage. The stratified coating is applied on copper or copper alloy internal fire wall 9 on the side of the combustion chamber fire cavity. The thickness of first nickel layer 11 of this coating ranges from 50 μm to 1000 ↑μm, and second chrome layer 12, from 10 μm to 500 μm.

FIG. 3 shows the design of the LRE combustion chamber casing with a stratified coating on the side of the nozzle internal fire wall. The design of the casing in this embodiment is completely identical with the design presented in FIG. 1, except that the stratified coating of the nozzle is applied here in subsonic section 3 on the side of the fire cavity, and in the supersonic section in area 5 on the inlet side. The coating characteristics are the same as in the first embodiment (FIG. 1), but its location here is different, as the coating is applied in said area 5, defined by axial sizes $L_3$ and $L_5$ as shown in FIGS. 1 and 3. The coatings are described above with reference to FIG. 2.

Figure 4:
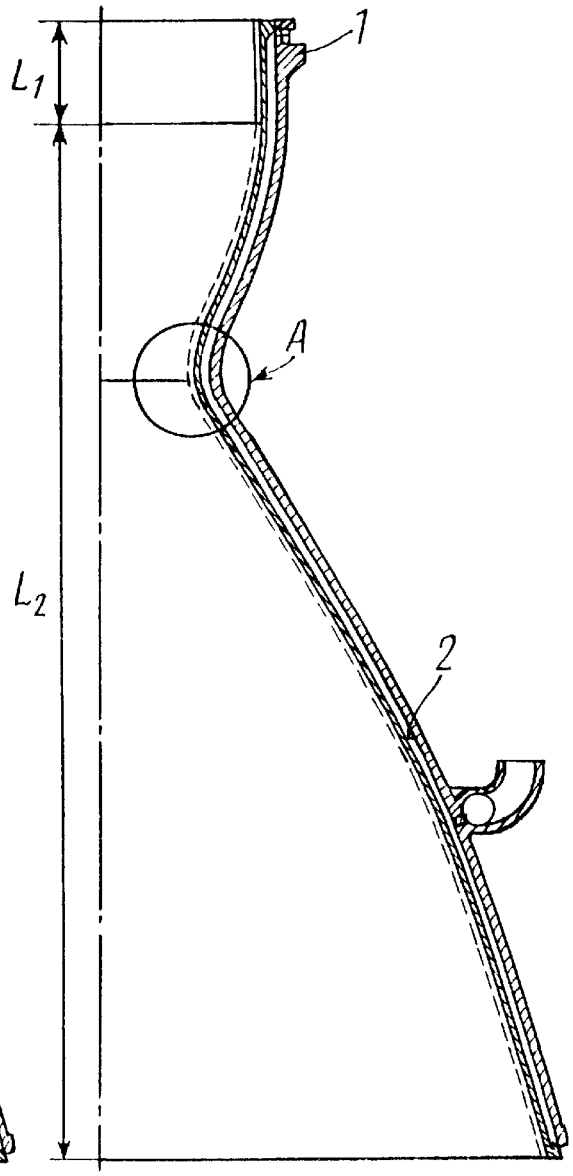
FIG. 4 illustrates the combustion chamber casing with a stratified coating on the internal fire wall of the entire casing.

FIG. 4 shows a casing embodiment with a stratified coating on the internal fire wall of the casing, i.e. combustion chamber 1 and nozzle 2 (the coating is applied on the surfaces defined by axial sizes $L_1$ and $L_2$ as shown in FIGS. 1 and 4). The design of the casing is similar to that presented in FIG. 1. The coatings are described above with reference to FIG. 2.

In the casing embodiments illustrated in FIGS. 1, 3 and 4 the external structural envelope is made from steel or a nickel alloy, whereas the internal fire wall is made from copper or a copper alloy (e.g. bronze). The stratified coating applied on the casings is described above with reference to FIG. 2.

Figures 5, 6:
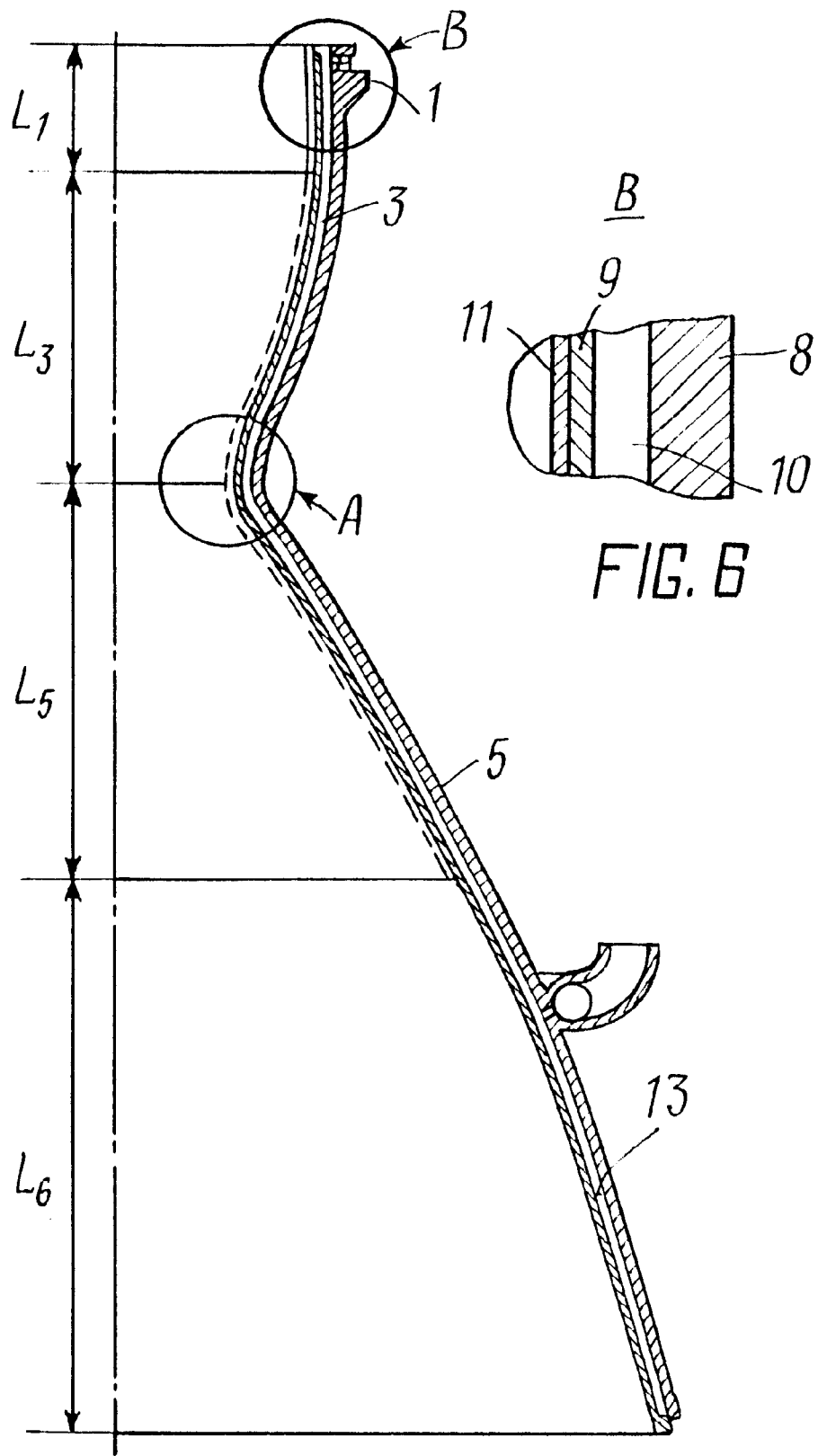
FIG. 5 illustrates the combustion chamber casing with a nickel coating on the internal fire wall of the combustion chamber and with a stratified coating on the internal fire wall of the nozzle main section.
FIG. 6 illustrates scaled up area B presented on a smaller scale in FIG. 5.

The embodiment illustrated in FIG. 5 differs from those presented in FIGS. 1, 3 and 4 in that the internal fire wall of a portion of nozzle supersonic section 13 on the outlet side (over length $L_6$ in FIGS. 1 and 5) is made from steel or a nickel alloy. This portion has no coating. The nozzle coating in subsonic section 3 and in the portion of the supersonic section on the side of inlet 5 (i.e. over lengths $L_3$ and $L_5$ in FIGS. 1 and 5) is similar to the coating shown in FIG. 2 and described with the reference thereto.

The internal fire wall in combustion chamber 1 on the side of the fire cavity (i.e. over length $L_1$) is provided with a nickel coating 50 μm to 1000 μm thick. Coating area B (see FIG. 5) is upscaled in FIG. 6.

In the embodiment illustrated in FIG. 6 structural envelope 8 embraces internal fire wail 9 which is provided with ribs and slots (not shown in the figures) forming regenerative cooling passage 10. Internal fire wall 9 has nickel coating 11 described in the previous paragraph.

Significantly, the supersonic section of the nozzle on the outlet side can be made in the form of a heat resistant metal envelope performing simultaneously the function of an internal fire wall. This part of the envelope can be made, for instance, from molybdenum or a heat resistant nonmetal material, in which case it does not need any coating.

The thickness values of coatings in the embodiments illustrated in FIGS. 2 and 6 are optimal. Smaller thickness values tend to reduce the effectiveness of coatings, whereas thicker coatings call for more complex production procedures and techniques and are often not viable from the economic viewpoint.

Besides the coatings illustrated in FIGS. 2 and 6, it is also possible to apply additional coatings, e.g. with a view to preventing mechanical damage to the main coating and to the internal fire wall of the casing. Such coatings, however, are of little significance to the proposed design.

It is worth noting that the combustion chamber need not be necessarily cylindrical. It may be conical, pear-shaped or of any other form.

The regenerative cooling passage may have different configurations and its inlet and outlet portions may be located in different places. The combustion chamber may comprise internal cooling slotted components (gas screen belts) communicating with the hydraulic duct.

Typically, cross-sections of the combustion chamber casing made in the longitudinal direction show differences in the design and sizes of cooling passages, external structural envelopes and internal fire walls. For simplicity's sake, however, in a number of cross-sections of regions A, and B illustrating the preferred embodiments such differences were ignored as immaterial to the essence of the present invention.

Industrial Applicability

The claimed combustion chamber casing of liquid-fuel rocket engines is designed primarily for high-thrust combustion chambers of oxygen-kerosene liquid rocket engines.

The invention is claimed as follows:

1. A combustion chamber casing of a liquid-fuel rocket engine comprising
    a combustion chamber;
    a nozzle having a subsonic section, a supersonic section, and a throat diameter;
    said combustion chamber and nozzle comprising an external structural envelope and an internal fire wall which is arranged inside said external structural envelope and made from copper or a copper alloy; and
    a regenerative cooling passage formed between said external structural envelope and said internal fire wall;
    said internal fire wall having an inner surface provided with a metal coating of nickel only from 50 $\mu$m to 1000 $\mu$m thick, a layer of chromium from 10 $\mu$m to 500 $\mu$m thick being applied onto said nickel layer in a region of said nozzle throat, said region including said subsonic and supersonic sections.

2. The combustion chamber casing as claimed in claim 1, wherein the external structural envelope is made from steel or a nickel alloy.

* * * * *